UNITED STATES PATENT OFFICE.

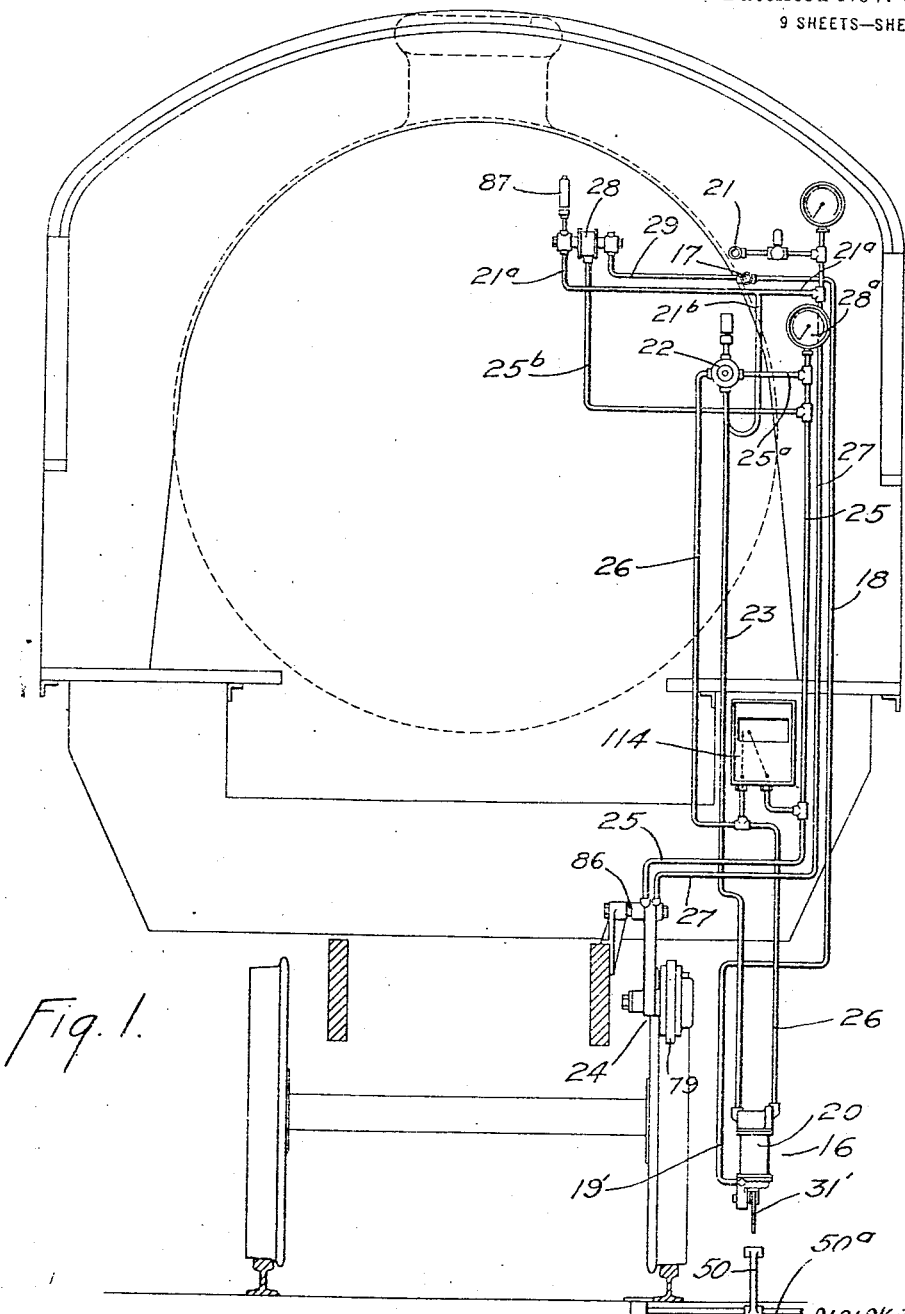

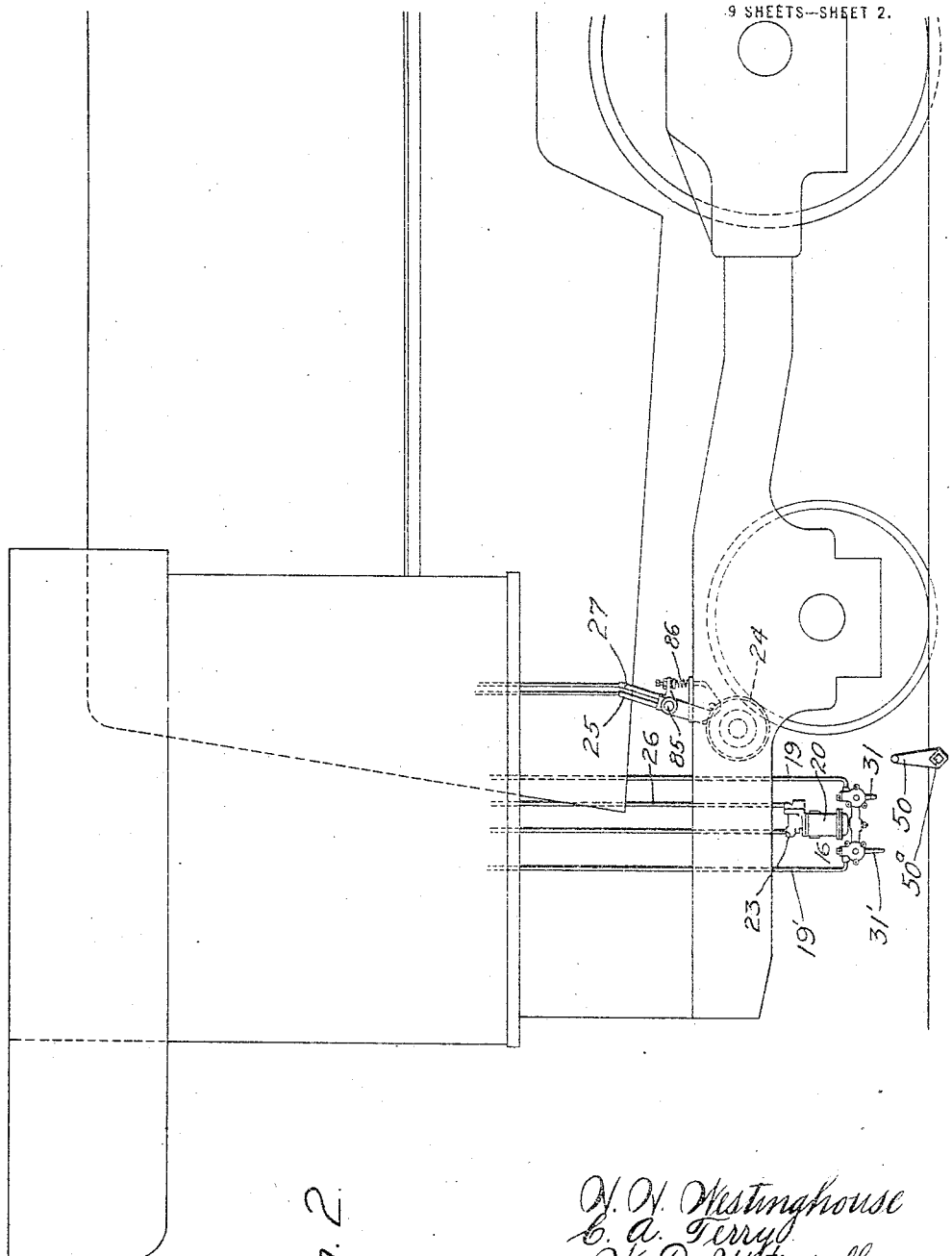

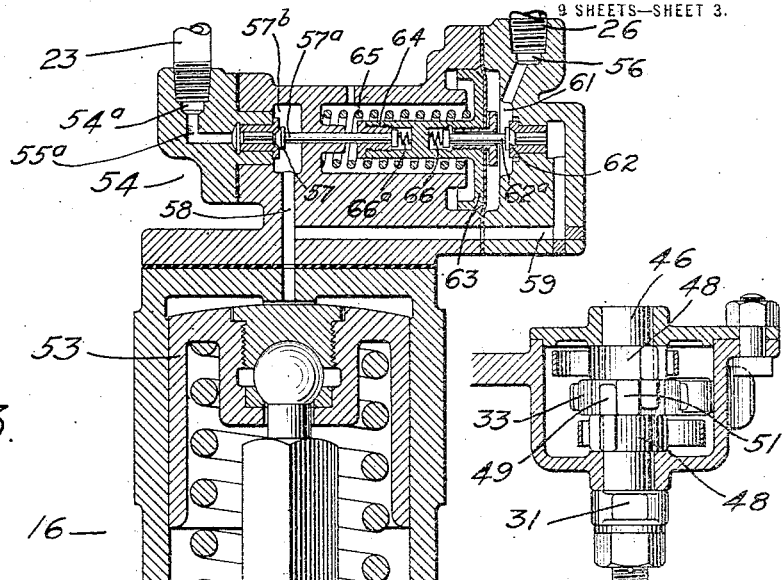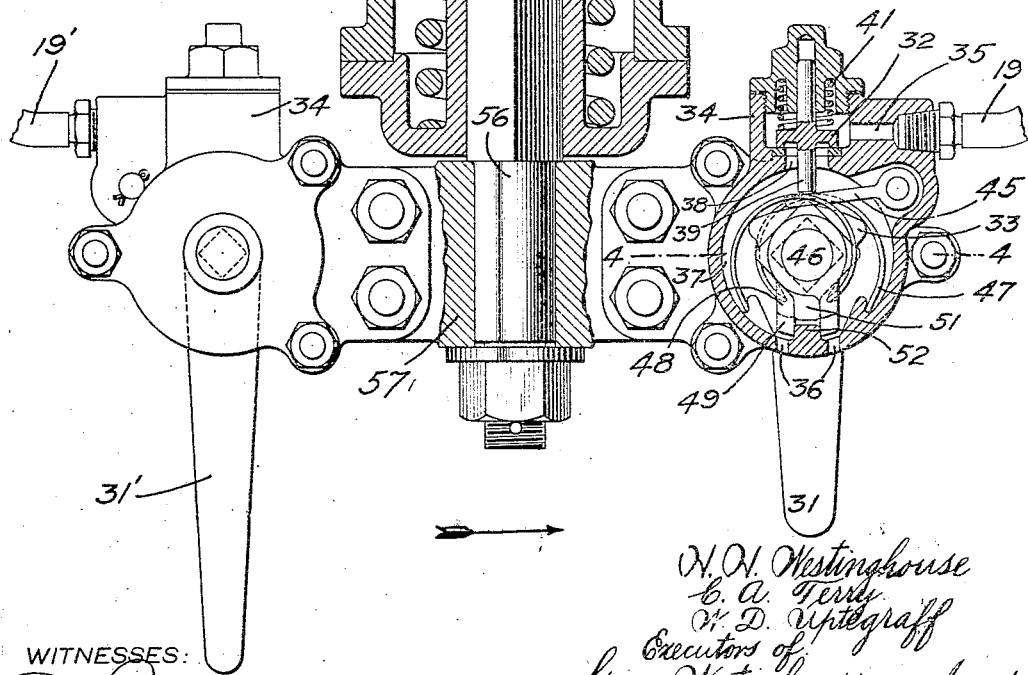

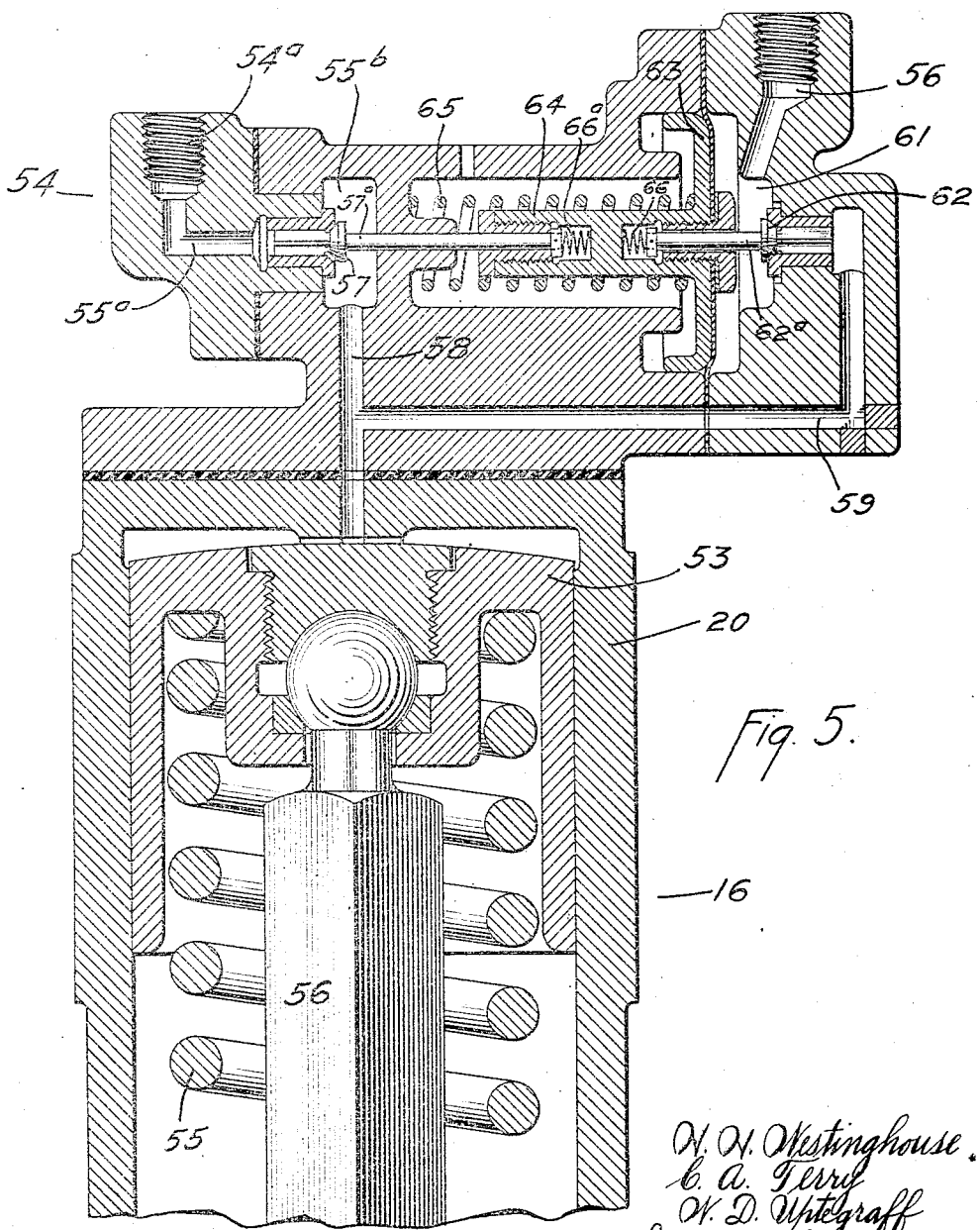

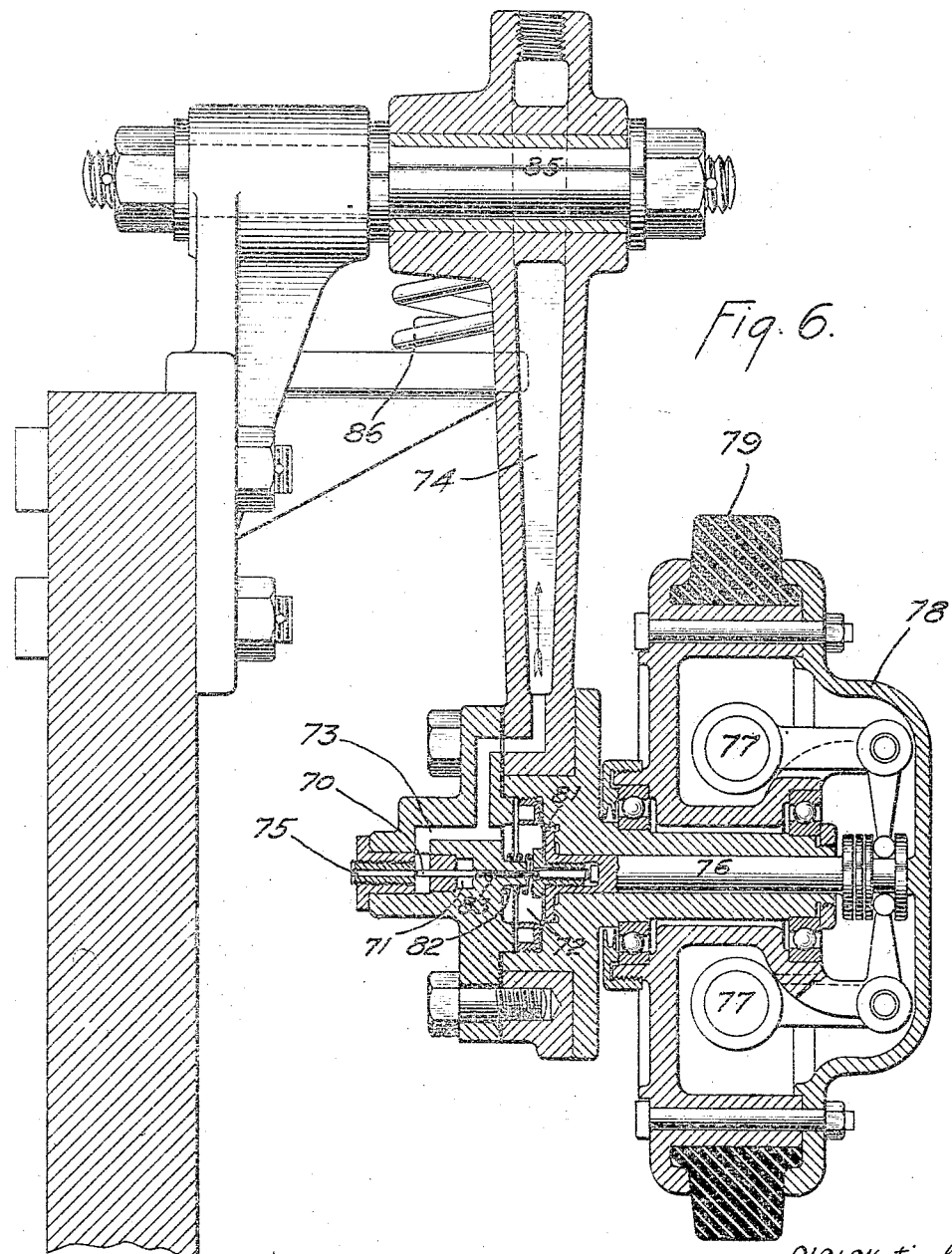

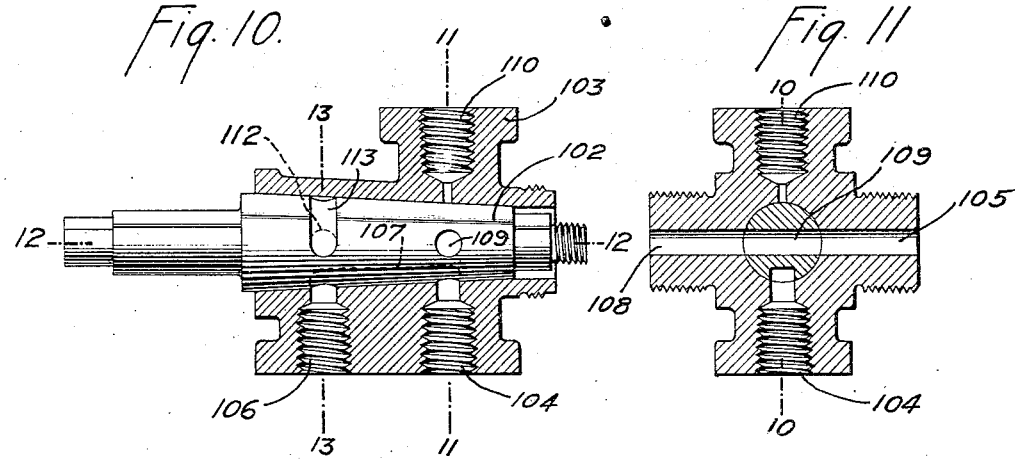
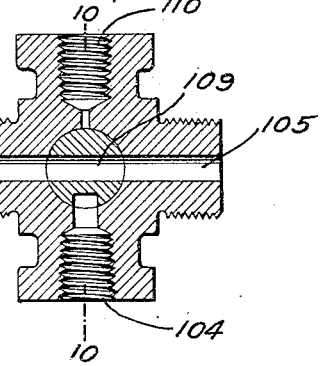
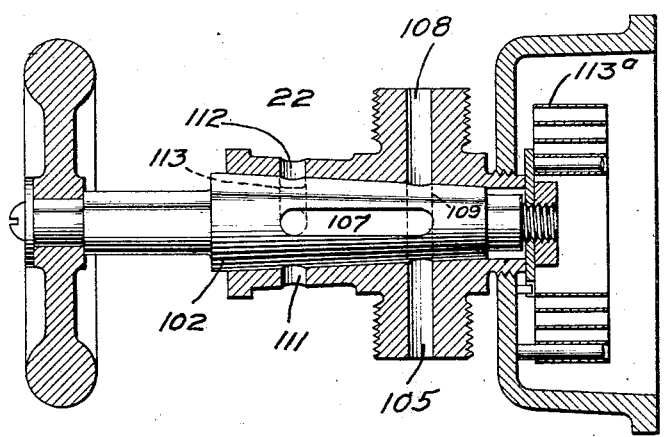
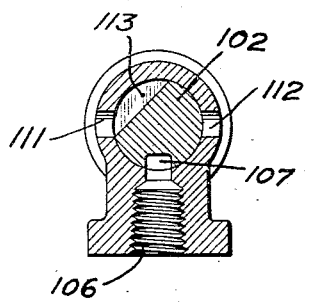

GEORGE WESTINGHOUSE, DECEASED, LATE OF PITTSBURGH, PENNSYLVANIA, BY HENRY HERMAN WESTINGHOUSE, OF KIDDERS, NEW YORK, CHARLES APPLETON TERRY, OF NEW YORK, N. Y., AND WALTER DENNY UPTEGRAFF, OF PITTSBURGH, PENNSYLVANIA, EXECUTORS.

AUTOMATIC TRAIN CONTROL.

1,284,006.

Specification of Letters Patent.

Patented Nov. 5, 1918.

Application filed September 28, 1914. Serial No. 863,660.

*To all whom it may concern:*

Be it known that GEORGE WESTINGHOUSE, deceased, late a citizen of the United States, and a resident of Pittsburgh, in the county of Allegheny and State of Pennsylvania, has made a new and useful Invention in Automatic Train Control, of which the following is a specification.

An object of this invention is to produce improved apparatus for stopping trains or other rail traversing vehicles by automatically applying the brakes of the vehicle in case the engineer or driver advertently or inadvertently passes a danger or an opposing signal.

A further object is to produce automatic apparatus adapted to limit the speed of the train or vehicle to a determined or safe speed.

A further object is to produce automatic train stopping means which may be rendered operative or inoperative by the engineer so that the train can pass opposing or danger signals without occasioning an automatic operation of the apparatus.

A further object is to produce automatic train stopping apparatus in which indicating or recording means are employed such that a record is made of each time the apparatus is manipulated, to permit the train to pass opposing signals without bringing the automatic apparatus into operation and such that a continuous record is made of the speed of the train.

These and other objects, which will be made apparent to those skilled in the art by the further description of the apparatus, are attained by means of apparatus embodying the features herein described and illustrated in the drawings accompanying and forming a part of this application.

In the drawings, Figure 1 is a diagrammatic view of apparatus embodying the invention and illustrates one method of mounting it on a locomotive engine.

Fig. 2 is a fragmental elevation of a locomotive engine equipped with apparatus embodying the invention, the portion of the apparatus illustrated being diagrammatically shown.

Fig. 3 is a view partially in vertical section and partially in elevation of signal engaging mechanisms forming a detail of the illustrated embodiment of the invention.

Fig. 4 is a fragmental sectional view along the line 4—4 of Fig. 3.

Fig. 5 is a fragmental sectional view, on an enlarged scale, of the apparatus shown in Fig. 3 and discloses pressure actuated means for varying the position of the signal engaging mechanism and an automatic valve mechanism for controlling the delivery of fluid under pressure to the pressure actuated means.

Fig. 6 is a sectional view along line 6—6 of Fig. 8 of a pressure governing mechanism or a speed responsive valve mechanism forming a detail of the illustrated embodiment of the invention.

Fig. 10 is a sectional view along the line 10—10 of Fig. 11 and illustrates a hand release valve, which forms a detail of the illustrated embodiment of the invention.

Fig. 11 is a sectional view along the line 11—11 of Fig. 10.

Fig. 12 is a sectional view along the line 12—12 of Fig. 10 shown in connection with a return spring for yieldingly holding the valve to its normal position.

Fig. 13 is a sectional view along the line 13—13 of Fig. 10.

Figure 7:
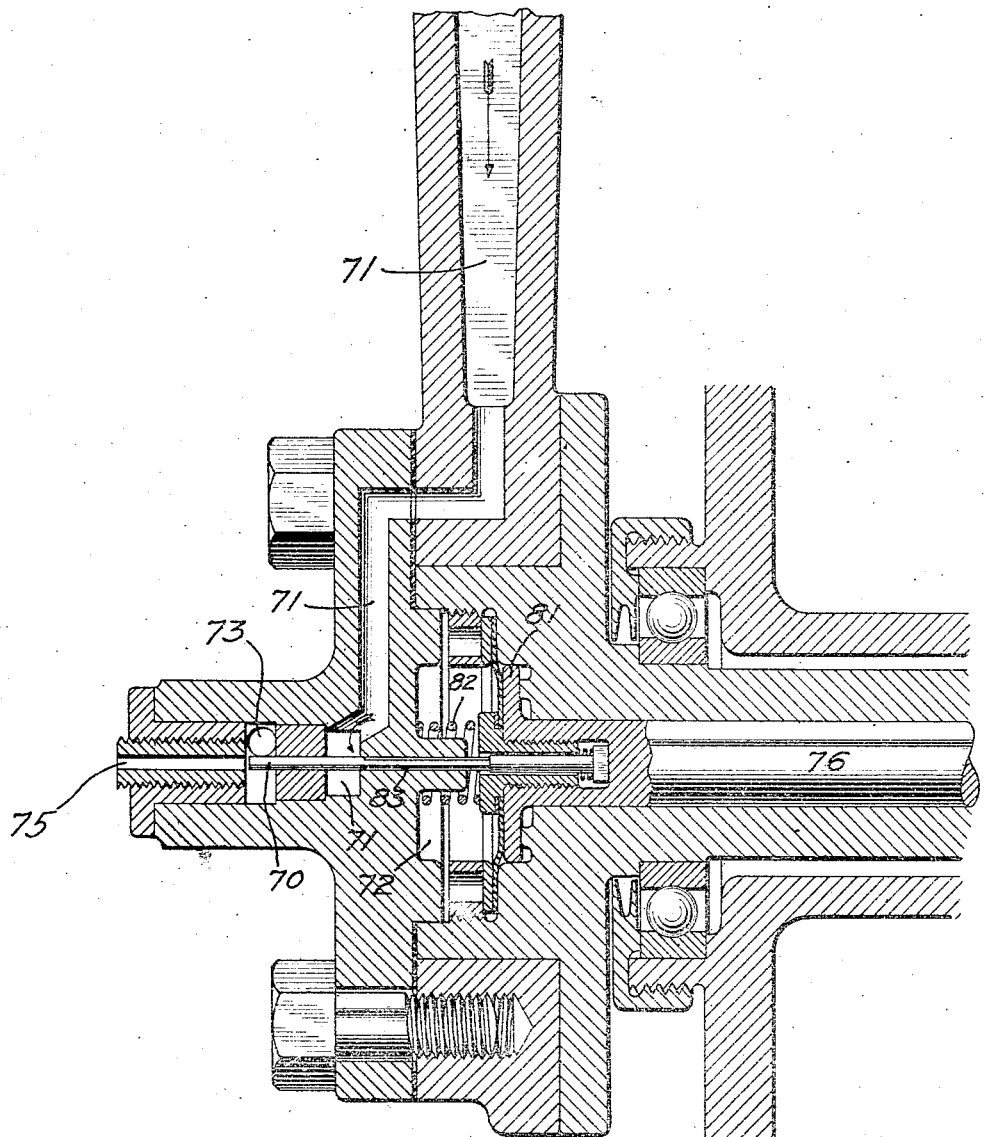
Fig. 7 is a fragmental sectional view, on an enlarged scale, along line 7—7 of Fig. 8.

The apparatus illustrated as an embodiment of the invention, includes automatic means adapted to engage and be actuated by signals or projecting arms located along the track. The automatic means illustrated is adapted to apply the brakes of the train, but it will be understood that means may be employed for shutting off the steam or motive fluid to the engine or driving motor, either independently of or in conjunction with the application of the brakes. The apparatus illustrated also includes means for varying the position of the signal arm engaging mechanism in response to variations of the speed of the train, so that the train can proceed at certain determined speeds past signal arms located along the track without occasioning an automatic operation of the apparatus, but cannot pass the signals without automatically setting the brakes if it is proceeding at a speed greater than the determined speed. The apparatus also includes means under the control of the engineer for moving the signal engaging mechanism so that it will not be engaged by opposing signals, but is equipped with a recording mechanism for recording the manipulations of the apparatus by the engineer for the purpose of passing opposing signals. The apparatus also includes means independent of the signal engaging mechanism for limiting the speed of the train.

Referring now to the drawings by means of reference numerals:

The apparatus illustrated as an embodiment of the invention, includes a signal engaging mechanism 16, which, as shown, communicates with the brake pipe or with an automatic valve of the brake operating system through a pipe 17, a pipe 18 and pipes 19 and 19'. This mechanism is adapted to vary the pressure in the brake pipe, so as to occasion either a service or an emergency application of the brakes, as will hereinafter be described. A cylinder 20 of the mechanism 16 (see Fig. 5) and its coöperating piston are adapted to vary the position of the mechanism 16 in response to variations in the speed of the train. Fluid under pressure from a source of high pressure supply, such for example, as the main reservoir of the brake system, is delivered to the cylinder 20 through a pipe 21, branch pipes 21ª and 21ᵇ, a hand release valve 22 and a pipe 23. Fluid pressure from a pressure governing or speed responsive valve mechanism 24 is also delivered to the mechanism 16, through a pipe 25, branch pipe 25ª, the hand release valve 22 and a pipe 26. Pressure from the main reservoir is delivered to the governing mechanism 24 through a pipe 27. The apparatus illustrated also includes a speed limiting mechanism 28, which operates in response to variations in the degree of fluid pressure delivered by the governing mechanism 24 to occasion either a service or an emergency application of the brakes when the train exceeds a certain determined or safe speed. The mechanism 28 communicates with the governor mechanism 24, through branch pipe 25ᵇ, with the source of high pressure fluid supply, through pipe 21ª, and with the brake pipe through the pipe 29.

Referring more particularly to Fig. 3, the signal engaging mechanism generally designated by the numeral 16 is provided with two release valves 32, each of which is adapted to be opened, through the agency of a separate cam 33, by a separate lever 31 or 31', for the purpose of reducing the pressure in the pipe 17 and of thereby occasioning an aplication of the brakes. Only one of these valves is illustrated in section since they are similar in structural details, and consequently only one will be described.

The casing 34 of the valve 32 is provided with an inlet port 35 which communicates through the pipe 19 with the pipe 18 and consequently with the pipe 17. The casing is also provided with discharge ports 36, which communicate with the atmosphere and with an enlarged cam inclosing chamber 37 formed within the casing 34. The chamber 37 communicates with a port 38 which is controlled by the valve 32 and through which the stem 39 of the valve projects. The valve 32 is normally held in the closed position by a spring 41 and is adapted to be lifted, for the purpose of opening communication between the port 35 and the ports 36, by the cam engaging finger 45, pivotally mounted within the casing and extending between the end of the valve stem 39 and the cam 33.

The cam 33 is a double throw cam, and is mounted on the squared portions of a shaft 46, which is journaled in the casing 34 and extends across the chamber 37. Two curved bar springs 47 are employed for yieldingly holding the cam 33 in the normal or central position in which the valve 32 is closed. One end of each spring 47 bears against a separate lug, formed on the casing 34, within the chamber 37, and the other end of each spring bears against or is secured to a separate spring block 48. Both the spring blocks 48 are rotatively mounted on the cam shaft 46 and each is provided with a laterally projecting lug 49, which is adapted to engage a lug 51 formed on the cam, and to be pressed by its corresponding spring 47 into engagement with a centering lug 52 formed on the casing 34. The two lugs 49 of the separate blocks are located on opposite sides of the cam lug 51, and of the centering lug 52 and consequently coöperate with each other to normally hold the cam in the normal or central position. With such an arrangement the cam 33 is capable of being turned in either direction by its actuating lever 31 which is rigidly mounted on the cam shaft, and a rotation in either direction will raise the finger 45, and thereby open the valve 32. The turning of the cam will move one of the spring blocks, due to the engagement of the lugs 49 and 51, while the other spring block will be held in the central position by the centering lug 52. This places one of the springs 47 under tension so that it will return the cam to the central position as soon as the lever 31 is released.

The opening of either valve 32, occasions a reduction of pressure in the pipe 17 by exhausting air through the pipe 17, the pipe 18 and the branch pipes 19 and 19'.

In the apparatus illustrated, the valve operating levers 31 and 31' are adapted to be engaged by signal arms or uprights 50 (see Figs. 1 and 2), located along the track, if the train proceeds past them when they are raised to the danger or opposing position. In Figs. 1 and 2 an arm or upright 50, is shown mounted on a rod 50ª, which is capable of being turned to raise the upright to the lever engaging position, or to move it out of the path of travel of the levers. It will, of course, be understood that the signal arms 50 may be located in any desired position with relation to the rails, and that the position of the levers 31 and 31' on the locomotive may be varied correspondingly. While it is not essential to the invention to locate the signal arms 50 adjacent to the rails, by so doing the signal engaging mechanism 16 may be mounted low on the wheel frame of the locomotive and consequently eliminate disadvantages which might result from a swaying of the locomotive.

In the drawings, the lever 31' is longer than the lever 31 and consequently will engage signal arms which will not be engaged by the lever 31. The apparatus has also been so proportioned that a momentary opening of the valve 32, coöperating with the lever 31', will occasion a service application of the brakes, while a momentary opening of the valve 32, coöperating with the shorter lever 31, will occasion an emergency application of the brakes. This may be accomplished by so proportioning the port areas of the two valves 32 that the valve coöperating with the lever 31 will discharge a greater quantity of air during the momentary opening than the other valve. Inasmuch as both the valves will be opened by a signal arm 50, capable of engaging the lever 31, the exhaust port areas of the two valves may be so proportioned that the opening of one will occasion a service application of the brakes, while the successive opening of the two will occasion an emergency application of the brakes.

It is necessary to limit the speed of trains along certain sections of track and different sections require different speed limits. For this reason means are provided for varying the positions of the levers 31 and 31' in response to variations in the speed of the train, so that they will be engaged by signal arms or uprights of determined heights, located along dangerous sections of track, if the train proceeds at a speed greater than the predetermined or fixed speed for those sections, but will pass without being engaged by the signals if the train is not exceeding the fixed speed. The signals or uprights located along these dangerous sections of track may be stationary or fixed, and their height so proportioned that they will engage one or both of the levers 31 and 31', dependent on the speed of the train, and thereby occasion an application of the brakes on the train, if the train moves past them at a speed greater than the predetermined or fixed speed, but will not engage either of the levers if the train is moving below the predetermined speed.

The means illustrated in Figs. 3 and 5 for varying the positions of the levers 31 and 31' in accordance with variations of the speed of the train, consist of the cylinder 20, a piston 53 located within the cylinder, a piston rod 56 secured to the piston and on which both the valve casings 34 and consequently both the levers 31 and 31' are mounted, a valve mechanism, generally indicated by the numeral 54, for admitting fluid under pressure to the cylinder 20, and a coiled spring 55 surrounding the rod 56 and operating in opposition to the pressure of the fluid within the cylinder as exerted on the piston 53.

The valve mechanism 54 is adapted to admit varying fluid pressures to the cylinder 20, in accordance with variations in the speed of the train, and includes a valve 57, for admitting fluid from a source of high pressure supply, such for example as the main reservoir of the brake system, to the cylinder 20, and a valve 62 for controlling communication between the cylinder and the pressure governing mechanism 24, which as will hereinafter be more fully described, is adapted to deliver fluid at pressures varying in direct ratio with the variations of speed of the locomotive or train. The operation of both the valves 57 and 62 is controlled by a pressure responsive member 64, which moves in response to variations in pressure of the fluid delivered by the governing mechanism 24, to a chamber 61, which is formed within the casing of the valve mechanism.

The casing of the valve mechanism is provided with a port 54ª, to which fluid from the main reservoir is delivered through the pipe 23, and which is in open communication with a passage 55ª. The cylinder 20 communicates through a passage 58 with a chamber 57ᵇ communication between which and the passage 55ª is controlled by the valve 57.

The valve 62 controls communication between the chamber 61 and a passage 59, which is in open communication with the passage 58 and consequently with the cylinder 20. Fluid pressure from the governing mechanism 24 is delivered to the chamber 61, through the pipe 26 and a port 56 of the valve casing. This chamber is provided with a flexible wall or diaphragm 63, which is exposed on one side to the pressure within the chamber and on the other side to atmospheric pressure. The member 64 is secured to the diaphragm 63 and moves with it in response to variations of pressure within the chamber 61, but the fluid pressure in the chamber 61, as exerted on the diaphragm, is opposed by a coiled spring 65, one end of which engages the member 64, while the other end engages a rigid wall of the casing. The stem 62ª of the valve 62 extends through the diaphragm 63 and is provided with a head, which is located in a pocket of the member 64, and is so arranged that a movement of the member 64 in response to fluid pressure within the chamber 61 will positively open the valve, while a movement in the opposite direction, or in response to the pressure of the spring 65, will close the valve through the agency of a coiled spring 66, located within the head engaging pocket of the member 64, and so arranged that the valve will be yieldingly pressed to its seat.

The valve 57 is provided with a stem 57ª, which is also provided with a head located within a pocket of the member 64. The arrangement is such that a movement of the member 64 in response to pressure within the chamber 61, closes the valve 57 through the agency of the stem 57ª and a coiled spring 66ª, located within the head engaging pocket, while a movement of the member 64 in the opposite direction positively opens the valve 57 and delivers fluid under pressure from the main reservoir to the cylinder 20. The tension of the spring 65 and the area of the diaphragm 63 are so proportioned that the pressure delivered to the chamber 61, while the train is traveling at a predetermined speed, for example, of two miles an hour, is sufficient to shift the member 64 to open the valve 62 and close the valve 57, whereas when the pressure in the chamber 61 is decreased below that, or when the speed of the train is less than the determined speed, the spring 65 will shift the member 64 to close the valve 62 and open the valve 57. The valve stems 62ª and 57ª are so proportioned as to length and the pockets of the member 64, which engage the heads of the valve stems, are of such size that both valves may remain closed when the member 64 occupies certain intermediate positions.

The operation of the valve mechanism and of the piston 53 is as follows: When the train is at rest, the piston 53 is moved by the spring 55 to the upper end of its cylinder 20 and the spring 65 shifts the member 64, so that the valve 62 is closed and the valve 57 is open. As soon as main reservoir pressure is delivered to the port 54ª through the pipe 23, and to the cylinder 20 through the open valve 57, the piston 53 is forced downwardly to the lower extremity of its stroke, and the levers 31 and 31' are consequently moved to their lowest positions. As the train starts and increases in speed, the pressure delivered from the governing mechanism to the chamber 61 increases and finally, after the train has attained a determined speed, the pressure within the chamber 61 is sufficient to overbalance the pressure of the spring 65 and shift the member 64 to open the valve 62 and close the valve 57. The opening of the valve 62 places the cylinder 20 in communication with the chamber 61 and consequently with the pressure governing mechanism 24 and reduces the pressure within the cylinder to that existing within the chamber 61. The valve 62 will remain open and consequently the cylinder 20 will be subjected to variations in fluid pressure occasioned by the variations in the speed of the train, as long as the train exceeds the determined speed which, as has been said, may be two miles an hour. The piston 53 will therefore move up and down in the cylinder and will vary the positions of the levers 31 and 31' in response to the variations of pressure within the chamber 61, or in accordance with the variations in the speed of the train. As soon as the speed of the train is reduced below the predetermined speed, the member 64 is again shifted to close the valve 62 and open the valve 57, at which time main reservoir pressure will be delivered to the cylinder and the piston will be forced to its lowermost position.

With such an arrangement the levers 31 and 31' will be moved to different positions corresponding to the different speeds of the train, while the train is traveling at normal speeds, and will be moved to their lowermost position when the train is brought to a stop or is moving at a predetermined low speed.

Figure 8:
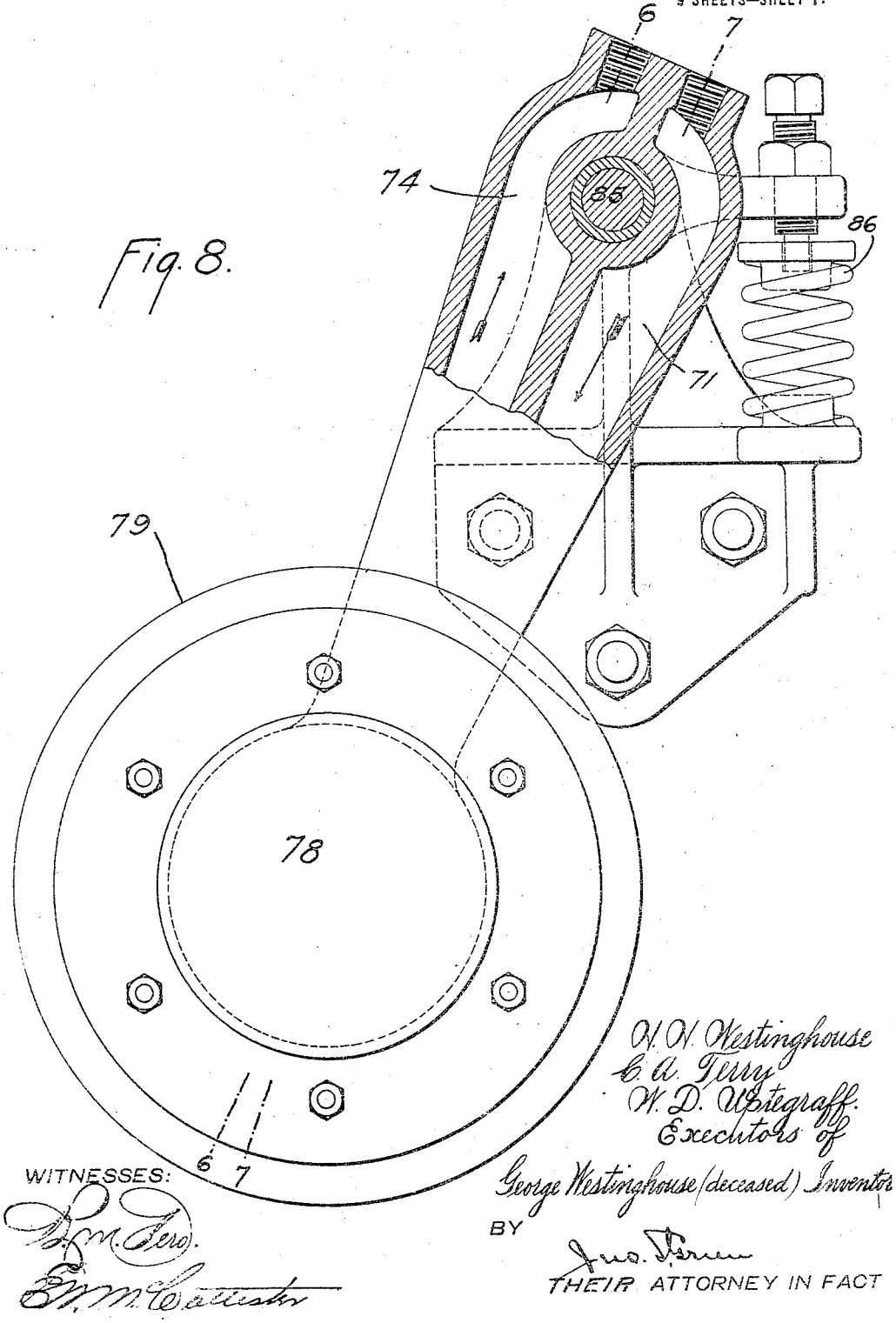
Fig. 8 is a view partially in side elevation and partially in section of the pressure governing mechanism or speed responsive valve mechanism, illustrated in Figs. 6 and 7.

The governor controlled mechanism, illustrated in Figs. 6, 7 and 8, is adapted to receive fluid under pressure from any suitable source, as for example, the main reservoir of the brake system, and to deliver fluid at pressure proportional to the speed of the train. The mechanism includes centrifugally-actuated, pressure responsive valve 70, which is adapted to control the delivery of pressure from a fluid admission passage 71 to a pressure chamber 72 and consequently to a passage 73, which communicates with the pressure chamber and with a fluid delivery passage 74. The valve 70 is also adapted to control the discharge of fluid from the passage 73 through an atmospheric relief port 75 and is so arranged that it establishes communication between the admission passage 71 and the pressure chamber 72 when the port 75 is closed, and closes communication between passage 71 and the chamber 72 when the port 75 is fully open.

As illustrated, the valve consists of a cylindrical rod which is capable of being moved longitudinally by means of the centrifugally controlled spindle 76. The spindle is actuated by means of centrifugal weights 77, corresponding in their functions to the weights of an ordinary fly ball governor. The weights 77 are pivotally mounted on suitable brackets formed within a rotatable casing 78, which is adapted to be driven by a wheel of the locomotive and for that purpose is provided with a tire 79 of any suitable material, such as fiber or rubber, capable of gripping the tire of the locomotive wheel and of, to some extent, yielding to fortuitous jars to which the locomotive wheel is subjected.

The spindle 76 is connected to a flexible diaphragm, which forms a wall of the chamber 72, and the centrifugal action of the weights 77 is thereby opposed by the fluid pressure in the chamber as transmitted through the diaphragm. A coiled spring 82 is also provided within the chamber 72 for augmenting the fluid pressure on the diaphragm in resisting the centrifugal actions of the weights 77. The valve 70 is secured to the end of the spindle 76 and extends axially thereof and is located concentrically therewith. It is provided with a grooved portion 83, which extends through the aperture formed in a partition separating the chamber 72 from the passage 71, and establishes communication between the chamber and the passage when the ends of the grooves on the grooved portion are exposed in the passage 71. The end of the valve is adapted to enter the port 75 and to function as a plug valve in controlling the discharge of fluid through that port. The valve is preferably so proportioned that the grooved portion 83 will admit greater quantities of fluid to the chamber 72 from the passage 71 as the effective area of the port 75 is decreased and, vice versa, will increase the opening of the port 75, as communication is gradually closed off between the passage 71 and the chamber 72.

With such an arrangement, the pressure in the chamber 72, and consequently in the passage 73, will vary in response to the centrifugal action of the weights or in response to variations in speed of the casing 78. As the speed of the casing 78 increases, the weights 77 will move outwardly and will therefore tend to close the port 75 and to establish communication between the passage 71 and the chamber 72, so as to increase the pressure in the chamber 72. The increasing pressure in the chamber 72, however, opposes the centrifugal action of the weights and tends to move the spindle to open the port 75. As the speed of the casing decreases, the weights moving inwardly close communication between the chamber 72 and the passage 71 and increase the opening of the port 75, thereby reducing the pressure in the passage 74 an amount corresponding to the decrease in speed of the casing 78 or of the locomotive.

As illustrated, the rotatable casing 78, and the stationary casing inclosing the valve 70 and the coöperating fluid passages are pivotally mounted on a pin or trunnion 85 and are provided with an adjustable spring 86 for pressing the tire 79 of the casing 78 into engagement with the tire of one of the wheels of the locomotive. In Fig. 1 the casing 78 is illustrated as engaging one of the driving wheels of the locomotive, but it will be understood that any means may be employed for driving the casing so that its speed is always proportional to the speed of the train.

The admission passage 71 is shown in Fig. 1 as communicating with the pipe 27, and the delivery passage as communicating with the pipe 25. With this arrangement, the pressure transmitted to the chamber 61 of the signal engaging means 16, illustrated in Figs. 3 and 5, will substantially correspond to the pressure existing in chamber 72 and consequently will vary in response to variations in speed of the train.

Figure 9:
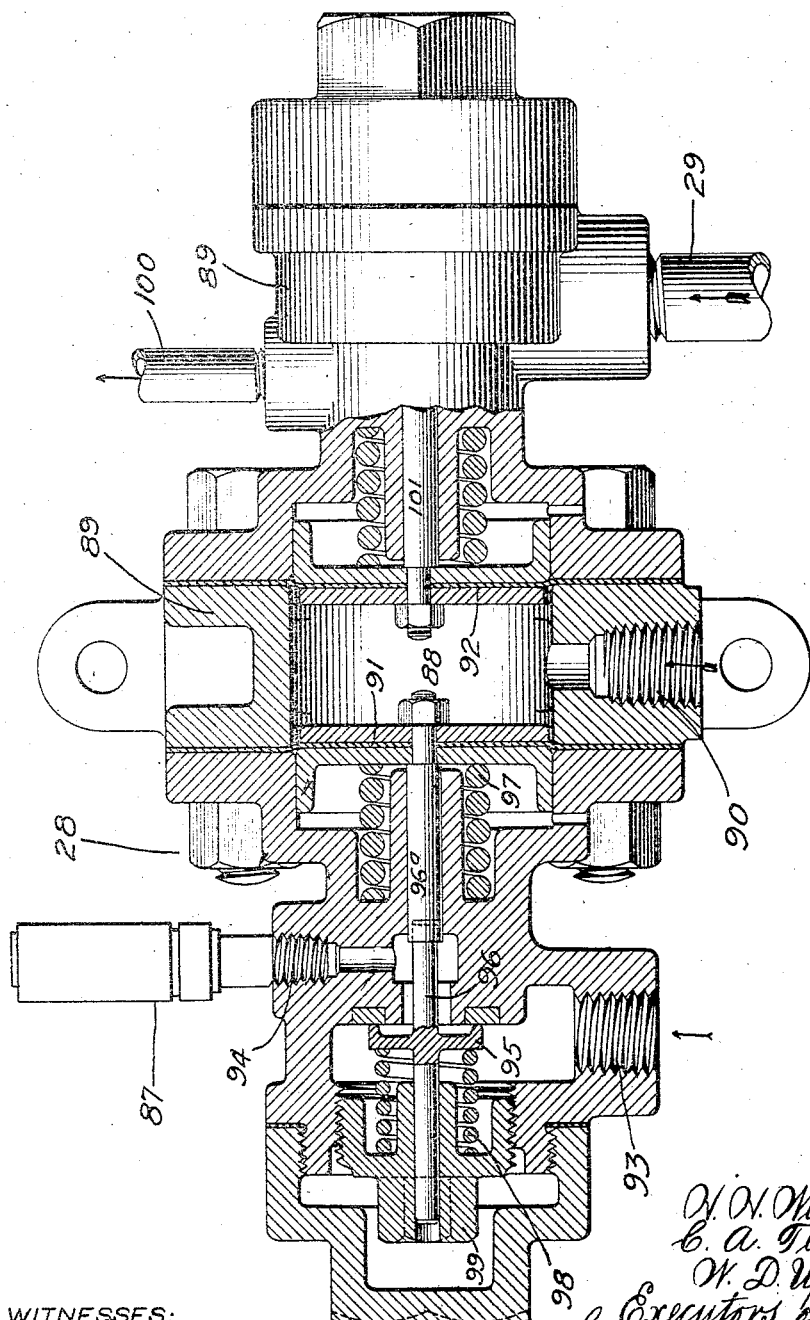
Fig. 9 is a view, partially in section and partially in elevation, of a speed limiting mechanism which forms a detail of the illustrated embodiment of the invention.

The apparatus illustrated is also adapted to occasion an automatic application of the brakes independently of the release valves 32 and the track signals or uprights 50, in case the train exceeds a predetermined or safe speed while traversing any section of the track. This is accomplished by means of the speed limiting mechanism, generally indicated by the numeral 28 in Fig. 1, and illustrated in detail in Fig. 9.

Broadly the mechanism consists of a valve, which is adapted to exhaust fluid from the brake pipe and is responsive in its operation to the pressure of fluid delivered by the governor mechanism 24. As illustrated, the speed limiting mechanism consists of two valves, one of which is adapted to open in response to fluid pressure delivered by the governing mechanism and to deliver fluid under pressure to a warning whistle 87, while the other, as previously described, is adapted to discharge fluid from the brake pipe to the atmosphere. This latter valve is so arranged that it will not open until after the whistle 87 has sounded a warning.

In the illustrated embodiment, the mechanism is provided with a central pressure chamber 88, formed within the casing 89, which is provided with a port 90, adapted to communicate with the branch pipe 25$^b$ (Fig. 1), and consequently with the delivery passage 74 of the governing mechanism 24. The chamber 88 is provided with flexible end walls, such as diaphragms 91 and 92, each of which is exposed on one side to the pressure within the chamber 88, and on the other side to atmospheric pressure. The casing 89 is bilaterally symmetrical with relation to the chamber 88, and is provided with a fluid inlet port 93, which is adapted to communicate with any suitable source of fluid, as for example, the main reservoir. The casing is also provided with a discharge port 94 which, as illustrated, is provided with the whistle 87, and communication between the ports 93 and 94 is controlled by a valve 95, which is adapted to seat on a ported wall of the casing extending substantially parallel to the diaphragms 91 and 92. The valve 95 is provided with a stem 96, which is loosely connected to a stem 96ª secured to the diaphragm 91 and is adapted to be actuated by the diaphragm 91, to open the valve and to establish communication between the ports 93 and 94, so that the fluid entering the port 93 will pass the port 94 and, in discharging, blow the whistle. The fluid pressure within the chamber 88 acting on the diaphragm 91 to open the valve 95 is opposed by two coiled springs, 97 and 98, the latter of which is capable of being adjusted by means of an adjustable spring block 99, so that the valve 95 can be set to open in response to a determined fluid pressure within the chamber 88.

The two ends of the casing 89 are similar and consequently only one end has been fully illustrated. The brake pipe of the brake system communicates, through the pipe 29, with a port formed in the casing and corresponding to the fluid inlet port 93. A discharge port corresponding to the port 94 is also provided, but it communicates with the atmosphere through a pipe 100. A valve corresponding to the valve 95 controls communication between these two ports and its valve stem 101 is operatively connected to the diaphragm 92, so that the valve is opened in response to a determined pressure within the chamber 88. This latter valve is also provided with fluid pressure opposing springs, but they are preferably heavier than the springs 97 and 98, and are so adjusted that the valve 95 will open first and sound a warning before the pipe 29 is placed in communication with the atmosphere for the purpose of reducing the pressure in the brake pipe and of setting the brakes. The port areas of the speed limiting valve may be so proportioned that the opening of the valve will occasion only a service application of the brakes, but they are preferably proportioned to occasion an emergency application.

In Fig. 1, a pressure gage 28ª is shown, which communicates with the pipe 25 and consequently indicates the pressure of the fluid delivered by the mechanism 24, and it may be so calibrated as to indicate at a glance the speed of the train, since the pressure in the pipe 25 is always proportional to the speed.

The apparatus illustrated is provided with means, under the control of the engineer or operator, for exhausting the pressure from the passage 55ª and the chamber 61, of the signaling engaging mechanism 16, and of thereby exhausting the piston actuating pressure from the cylinder 20 for the purpose of raising the piston 53 and of lifting the release valve operating levers 31 and 31', so that they will not be engaged by the signals or lever-engaging uprights located along the track.

The means for accomplishing this is generally indicated by the numeral 22 in Figs. 1 and 12, and has been previously referred to as the hand release valve mechanism. As illustrated in Figs. 10 to 13 inclusive, this valve mechanism consists of a plug valve 102, located within a casing 103, and adapted to control the delivery of fluid from the main reservoir, and also of fluid from the governor 24 to the mechanism 16. Fluid from the main reservoir is delivered through a branch pipe 21ᵇ to a port 104, with which the casing is provided, and fluid from the mechanism 24 is delivered to the port 105 through the branch pipe 25ª. Fluid from the main reservoir is delivered to the mechanism 16 through a port 106 of the casing and the pipe 23, the valve 102 being provided with a peripheral groove 107 for establishing communication between the ports 104 and 106. Governor pressure is delivered to the mechanism 16 through a port 108 and the pipe 26, the valve being provided with a transversely extending passage 109 for establishing communication between the ports 105 and 108. The casing is also provided with a port 110 with which a whistle is adapted to communicate, and with discharge ports, 111 and 112, both of which communicate with the atmosphere. With the valve 102 in the position illustrated in the drawings, high pressure fluid from the main reservoir is delivered to the port 54ª and governor pressure fluid is delivered to the port 56 of the mechanism 16. When it is desired to exhaust the pressure from the chamber 61, the valve is turned through 90 degrees, so as to move the peripheral groove 107 into communication with the port 108, in which position it also communicates with the port 111 and places the chamber 61 in communication with the atmosphere. The turning of the valve to this position also moves a peripherally extending groove 113, formed in the valve 102, into communication with the port 106 and the port 112, so that the pipe 23 is exhausted. In turning the valve to this position the passage 109 is also turned so that it establishes communication between the port 104 and the port 110, and thereby delivers high pressure fluid to the whistle, the blowing of which indicates that the valve has been turned and that the signal engaging mechanism 16 has been rendered inoperative. All the other ports of the valve are blocked, so that there is no waste of fluid under pressure.

If the valve 102 is turned to the pressure release position while the train is running at normal speed and consequently while the valve 62 is open, the pressure in the cylinder 20 is exhausted through the passage 59, the chamber 61 and the pipe 25. Pressure is also exhausted from the pipe 23, so that no fluid from the main reservoir can enter the cylinder and so that the cylinder may completely exhaust through the pipe 23 after the spring 65 has operated to close the valve 62. This will raise the levers 31 and 31' so that the train may proceed without engaging track signals and without occasioning a resultant automatic setting of the brakes.

The hand release valve is also provided for the purpose of raising the piston 53 and consequently the levers 31 and 31' when the train is starting and it is necessary to avoid track signals, since it will be remembered that with the apparatus illustrated fluid from the main reservoir depresses the piston 53 to the lower end of its stroke when the train is stopped, or when it is traveling at a rate of speed below a predetermined rate. Under such conditions the cylinder 20 will be completely exhausted through the valve 57 and pipe 23, since the valve 62 will be held in the closed position by the spring 65.

In Fig. 12, a return spring 113ª for the valve 102 is shown. In the valve illustrated is a flat coiled spring, one end of which is connected to the valve casing and the other to the valve 102 in such a manner that it is placed under tension when the valve is turned to the pressure release position. With such an arrangement the valve will return automatically to the normal position when its operating handle is released, and will therefore automatically subject the cylinder to operating fluid pressure, and move the signal engaging levers to a definite operating position dependent on the speed of the train.

Fig. 1 discloses a recording and indicating mechanism 114, which communicates with the pipe 26 and also with the pipe 25. The mechanism 114 is provided with two separate operating mechanisms, one of which is responsive to the pressure within the pipe 26 and consequently will indicate the operation of the hand release valve 22, while the other is in communication with the pipe 25 and consequently will indicate the variations in pressure delivered by the governor mechanism 24, or the speed of the train. Both these mechanisms may be provided with indicating or recording arms and may embody the general principles of the Bourdon tube.

In accordance with the United States patent statutes, a preferred embodiment of the application has been illustrated and described, but it will be understood that various changes, modifications, substitutions, additions and omissions may be made in the apparatus illustrated without departing from the spirit and scope of the invention as set forth by the appended claims, and that while the invention has been illustrated and described as operating in conjunction with the brake operating mechanisms of a locomotive engine, it may be effectively employed for shutting off the power or motive fluid of any engine, locomotive or motor, used for propelling a vehicle, and that it is not limited to use in connection with the brake operating mechanisms.

What we claim is:

1. Automatic train stopping apparatus, comprising two release valves communicating with the brake pipe of the brake system of the train, a separate signal engaging lever for actuating each valve, said levers being of different lengths and adapted to be successively engaged by a signal, means for moving said levers into or out of signal engaging positions, and means responsive to variations in the speed of the train for controlling the operation of said means whereby said levers occupy different determined positions for different speeds of the train.

2. In combination with a rail-traversing vehicle, signal engaging means for controlling the operation of said vehicle, signals of varying lengths located along the track of the vehicle for engaging and actuating said means, pneumatic means for moving said signal engaging means to different signal engaging positions, pressure actuated means for controlling the operation of the vehicle independently of said signal engaging means, and means responsive to the speed of the vehicle for delivering varying degrees of fluid pressure to said pneumatic means and to said pressure actuated means in response to variations in the speed of the vehicle.

3. In combination with a rail traversing vehicle, signal actuated means for controlling the operation of the vehicle, track signals of different lengths located along the track for engaging and actuating said means, pressure actuated means for varying the position of the signal actuated means to cause it to engage or pass free of certain of said track signals, and means responsive to variations in the speed of the vehicle for varying the actuating pressure delivered to said pressure actuated means in response to variations in the speed of the vehicle.

4. In combination with a rail traversing vehicle, signal actuated means for controlling the operation of the vehicle, track signals for engaging and actuating said means, pressure responsive means for varying the position of said signal actuated means to cause it to engage or pass free of certain of said signals, and a valve mechanism responsive in its operation to the speed of the vehicle for varying the degree of actuating pressure delivered to said pressure responsive means in response to variations in the speed of the vehicle.

5. In combination with a rail traversing vehicle, signal actuated means for controlling the operation of the vehicle, track signals for engaging and actuating said means, a speed limiting device, independent in its operation of the signal actuated means, for limiting the speed of the vehicle, and means responsive to variations in the speed of the vehicle for controlling the operative position of said means and the operation of said device.

6. In combination with a rail traversing vehicle, signal actuated means for controlling the operation of said vehicle, track signals for engaging and actuating said means, a speed limiting mechanism, independent in operation of said signal actuated means, for varying the pressure in the brake pipe of the brake operating mechanism of said vehicle to occasion an application of the brakes, and a mechanism responsive to variations in the speed of the vehicle for controlling the operation of said speed limiting mechanism and the operative position of said signal actuated means.

7. In combination with the brake actuating mechanism of a vehicle, signal actuated means for occasioning an application of the brakes of the vehicle, signals located along the line of travel of the vehicle for engaging and actuating said means, and a speed limiting mechanism for occasioning an application of the brakes of the vehicle, and means responsive to variations in the speed of the vehicle for controlling the operation of the speed limiting mechanism and for moving said signal actuated means into or out of signal engaging positions.

8. In combination with the brake actuating mechanism of a vehicle, signal actuated means for occasioning an application of the brakes of the vehicle, signals located along the line of travel of the vehicle for engaging and actuating said means, a speed limiting mechanism for occasioning an application of the brakes of the vehicle independently of said means, and means responsive to variations in the speed of the vehicle for moving the signal actuating means into or out of position to be engaged by the signal actuated means and for controlling the operation of the speed limiting mechanism.

9. In combination with the brake actuating mechanism of a vehicle, signal actuated means for occasioning an application of the brakes of the vehicle, signals located along the line of travel of the vehicle for engaging and actuating said means, a pressure responsive device for varying the position of said means, a pressure actuated speed limiting mechanism for occasioning an application of the brakes of the vehicle independently of said means, and means responsive to the speed of the vehicle for varying the actuating pressure delivered to said pressure responsive device and to said speed limiting mechanism.

10. In combination with the brake actuating mechanism of a vehicle, signal actuated means for occasioning an application of the brakes of the vehicle, signals located along the line of travel of the vehicle for engaging and actuating said means, a speed responsive mechanism responsive to variations in the speed of the vehicle for shifting the position of said means in response to variations in the speed of the vehicle, and manually controlled means for shifting the position of the signal engaging means so that said signal engaging means will pass free of said signals.

11. In combination with a rail traversing vehicle, signals of different lengths located along the track of the vehicle, signal engaging means carried by the vehicle for controlling the operation of the vehicle, means responsive to variations in the speed of the vehicle for moving said signal engaging means to definite positions corresponding to different speeds of the vehicle and manually controlled means for moving said signal engaging means to pass free of the track signals.

12. In combination with a rail traversing vehicle, signal actuated means for controlling the operation of the vehicle, track signals for engaging and actuating said means, manually controlled means for moving said signal actuated means, to pass free of the track signals, a recorder for indicating the operation of said manually controlled means, and the operation of said signal actuated means, and means for varying the position of the signal actuated means in proportion to the speed variation of the vehicle.

13. In combination with a rail traversing vehicle, signal actuated means for controlling the operation of the vehicle, signals located along the track of the vehicle for engaging and actuating said means, speed responsive means for varying the position of the signal actuated means to pass free of the track signals, and manually controlled means for moving said signal actuated means to pass free of the track signals.

14. A valve mechanism comprising a casing having a fluid inlet passage, a fluid delivery passage and an atmospheric relief port communicating with said delivery passage, a valve for controlling communication between said passages and the delivery of fluid through said port, and centrifugally actuated means responsive to the pressure of the fluid in the delivery passage for controlling the operation of said valve.

15. A valve mechanism comprising a casing having a fluid inlet passage, a fluid delivery passage and an atmospheric relief port communicating with said delivery passage, a valve for controlling communication between said passages and the delivery of fluid through said port, centrifugally actuated means for moving said valve to close the port and open communication between said passages, and means responsive to the pressure of fluid within the delivery passage for opposing the port closing motion of the valve.

16. A valve mechanism comprising a casing having a fluid inlet passage, a fluid delivery passage, and an atmospheric relief port communicating with the delivery passage, a valve for controlling communication between said passages and the delivery of fluid through said port, and centrifugally actuated means responsive to fluid pressure within the delivery passage for controlling the operation of said valve.

17. A valve mechanism comprising a casing having a fluid inlet passage, a fluid delivery passage and a fluid discharge port communicating with the delivery passage, means for controlling the delivery of fluid from the inlet to the delivery passage and the discharge of fluid from the delivery passage through the port, pressure responsive means for controlling the operation of said first mentioned means, and a centrifugally actuated weight for actuating said first mentioned means.

18. A valve mechanism comprising a casing having a pressure chamber, a fluid inlet passage, a fluid delivery passage communicating with said chamber, and a discharge port communicating with said delivery passage, a valve for controlling the delivery of fluid from the inlet passage to the chamber and from the delivery passage through the port, a flexible diaphragm forming a wall of the chamber to which said valve is secured, and centrifugally actuated means for controlling the operation of the valve.

19. A valve mechanism comprising a casing having a pressure chamber, a fluid inlet passage, a fluid delivery passage communicating with the chamber, and a discharge port communicating with the delivery passage, and centrifugally actuated means responsive to fluid pressure within the chamber for controlling the delivery of fluid from the inlet passage to the chamber and the discharge of fluid from the delivery passage through the port.

20. A valve mechanism comprising a casing having a pressure chamber, a fluid inlet passage, a fluid delivery passage communicating with the chamber, and a discharge port communicating with the delivery passage, a flexible diaphragm forming a wall of said chamber and movable in response to variations of pressure within the chamber, and a valve controlled by said diaphragm for controlling the delivery of fluid from the inlet passage to the chamber and from the delivery passage to the port, and centrifugally actuated means for actuating said valve.

21. A valve mechanism comprising a casing, having a pressure chamber, a fluid inlet passage, a fluid delivery passage communicating with the chamber and a discharge port communicating with the delivery passage, a flexible diaphragm forming a wall of the chamber and movable in response to variations of pressure within the chamber, a valve for controlling the delivery of fluid from the inlet passage to the chamber and from the delivery passage to the port, secured to said diaphragm, and a centrifugally actuated spindle secured to said diaphragm for actuating said valve.

22. In combination with a brake actuating mechanism of a train, a speed limiting mechanism effective under all operating conditions comprising pressure actuated means for giving a warning signal, pressure actuated means for causing a reduction of the brake pipe pressure of the brake actuating mechanism to occasion an application of the brakes, and speed responsive means for delivering actuating fluid to both of said first mentioned means.

23. In combination with the brake actuating mechanism of a train, a speed limiting mechanism effective under all operating conditions comprising pressure actuated means for giving a warning signal, pressure actuated means for exhausting the brake pipe of the mechanism to occasion an application of the brakes and a speed responsive valve mechanism comprising a casing, a fluid inlet passage, a fluid delivery passage and a fluid discharge port communicating with the delivery passage, and means responsive to variations in the speed of the train for controlling communication between said passages and the delivery of fluid through said port, said delivery passage delivering fluid to both of said pressure actuated means.

24. In combination with the brake actuating mechanism of a rail traversing vehicle, a signal actuated relief valve for reducing the pressure within the brake pipe of the brake actuating mechanism, a double throw cam for actuating said valve, a cam shaft on which said cam is mounted, a lug carried by the cam, a signal actuated lever for actuating the cam to open the valve, two spring blocks rotatively mounted on said shaft and engaging opposite sides of said lug, and a separate spring for yieldingly holding each block in a central position.

25. In combination with the brake actuating mechanism of a rail traversing vehicle, a signal actuated relief valve for reducing pressure within the brake pipe of the mechanism, a double throw cam for actuating the valve, a lug provided on the cam, a cam shaft on which the cam is mounted, a signal actuating lever for actuating the cam, two spring blocks rotatively mounted on the cam shaft and engaging opposite sides of said lug, a centering lug, and separate, oppositely disposed springs for holding each block in engagement with the centering lug.

In testimony whereof, we have hereunto subscribed our names.

HENRY HERMAN WESTINGHOUSE,
CHARLES APPLETON TERRY,
WALTER DENNY UPTEGRAFF,

*Executors of the estate of George Westinghouse, deceased.*

Witnesses:
WM. H. CAPEL,
R. E. ROGERS,
H. C. TENER,
GEO. J. TAYLOR.